A. KIENAST.
TURBINE.
APPLICATION FILED NOV. 8, 1910.

1,025,141.

Patented May 7, 1912.

WITNESSES

INVENTOR
ARNOLD KIENAST.
BY
ATTORNEYS

UNITED STATES PATENT OFFICE.

ARNOLD KIENAST, OF LEIPZIG, GERMANY.

TURBINE.

1,025,141.   Specification of Letters Patent.   Patented May 7, 1912.

Application filed November 8, 1910. Serial No. 591,341.

*To all whom it may concern:*

Be it known that I, ARNOLD KIENAST, a subject of the German Emperor, residing at Leipzig, Germany, have invented certain new and useful Improvements in Turbines, of which the following is a specification.

My invention relates to radial turbines.

My invention relates more particularly to turbines so constructed that the impelling fluid, whether air, steam, water or the equivalent passes through the turbine and acts upon its moving elements more than once before being permitted to finally leave said turbine.

My invention further relates to the character and form of the channel connected with the casing through which the impelling fluid passes from one part of the turbine casing to another and has for its object to provide a casing such that the impelling fluid in passing therethrough is distributed uniformly over the section thereof.

A more particular object of my invention is to so direct the impelling fluid through the aforesaid channels that eddies in the fluid and consequent energy losses may be substantially done away with.

Figure 1:
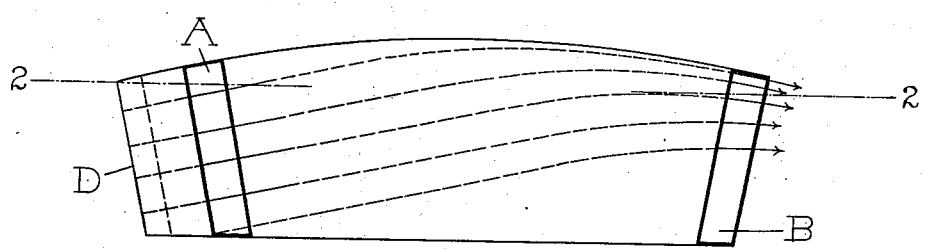
Figure 2:
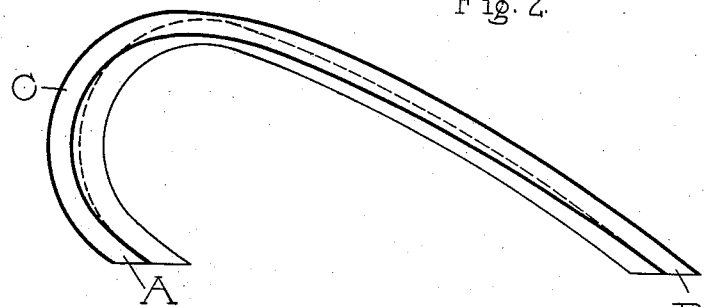
Figure 3:
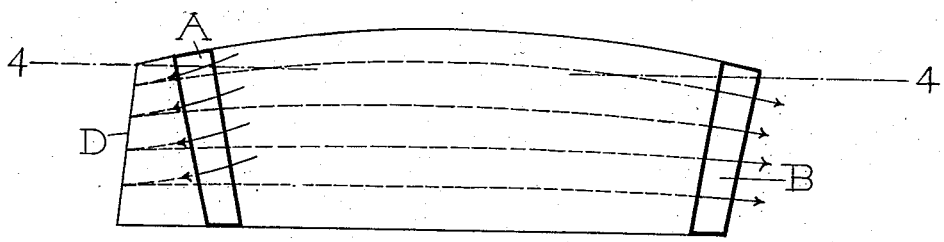
Figure 4:
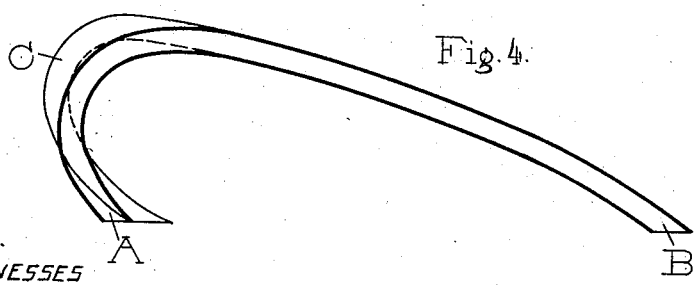

Referring to the drawings, which are of a somewhat diagrammatic character, Figure 1 represents, in elevation, a complete channel element of a turbine of the class referred to, as heretofore known; Fig. 2 is a section taken along the line 2—2 of Fig. 1; Fig. 3 represents a channel element similar to that of Fig. 1, but made according to my invention; and Fig. 4 is a section taken along the line 4—4 of Fig. 3.

In the drawings A and B are respectively the inlet and outlet openings of the channel element. These openings must of course lie in the same plane in order to be properly joined to the turbine casing; they must also be placed radially upon the turbine casing in order to correspond with one and the same set or sets of blades.

Since the channel elements are arranged upon the sides of the turbine casing and serve to carry the impelling fluid which, for the purpose of description may be assumed to be steam, from one point of said casing to another, it follows that said element must not only be bent outwardly and then back upon itself, but also radially inward to conform with the cylindrical form of the casing. As ordinarily made and as indicated in Figs. 1 and 2, this inward radial curving or twisting has taken place gradually over the entire length of the channel. Since, however, steam tends always to maintain a rectilinear direction and to be reflected perpendicularly to the generatrix when impacting with curved surfaces, it follows that in this older construction shown in Figs. 1 and 2, the steam will be so diverted by the character of the curve at C that throughout the passage the density of the steam will be constantly increasing toward the upper part thereof and that at the outlet the density of said steam will be a maximum at the top or outer portion of said outlet. The result of this lack of uniformity in the steam distribution throughout the channel and at the outlet will be eddy currents and consequent inefficiency and loss of energy. I avoid the above difficulty by concentrating the previously referred to inward radial bending or twist of the channel element at the point of maximum axial curvature, that is at C, Fig. 4. I accomplish this by using a generatrix D in forming the channel element parallel to or substantially parallel to the outlet rather than parallel to the inlet as in previously described construction. In this way the steam, almost immediately after entering the channel element is brought into a plane normal to that of the outlet B so that throughout the channel and at said outlet the density and distribution of the steam remains uniform.

Having described my invention I now claim:

1. In a turbine of the class described, a channel element having radially extending inlets and outlets and having a region of maximum radial twist coincident with its point of maximum axial curvature, substantially as and for the purpose described.

2. In a turbine of the class described, a channel element having radially extending inlets and outlets radially twisted at its point of maximum curvature, substantially as and for the purpose described.

3. In a turbine of the class described, a channel element having radially extending inlets and outlets comprising a steam passage a part of which lies in one plane and the remaining part in a second plane the change from one plane to the other being coincident with the point of maximum axial curvature, substantially as and for the purpose described.

4. In a turbine of the class described, a channel element provided with an inlet and an outlet and bent both axially and radially the generatrix of said channel at the point of maximum axial curvature being parallel to the outlet, substantially as and for the purpose described.

In testimony whereof I have hereunto set my hand in the presence of two subscribing witnesses.

ARNOLD KIENAST.

Witnesses:
RUDOLPH FRICKE,
ALBERT R. MORAWITZ.

Copies of this patent may be obtained for five cents each, by addressing the "Commissioner of Patents, Washington, D. C."